July 22, 1930.  G. H. HINES  1,771,040
FLEXIBLE AUTOMATIC TRANSMISSION
Filed May 31, 1929
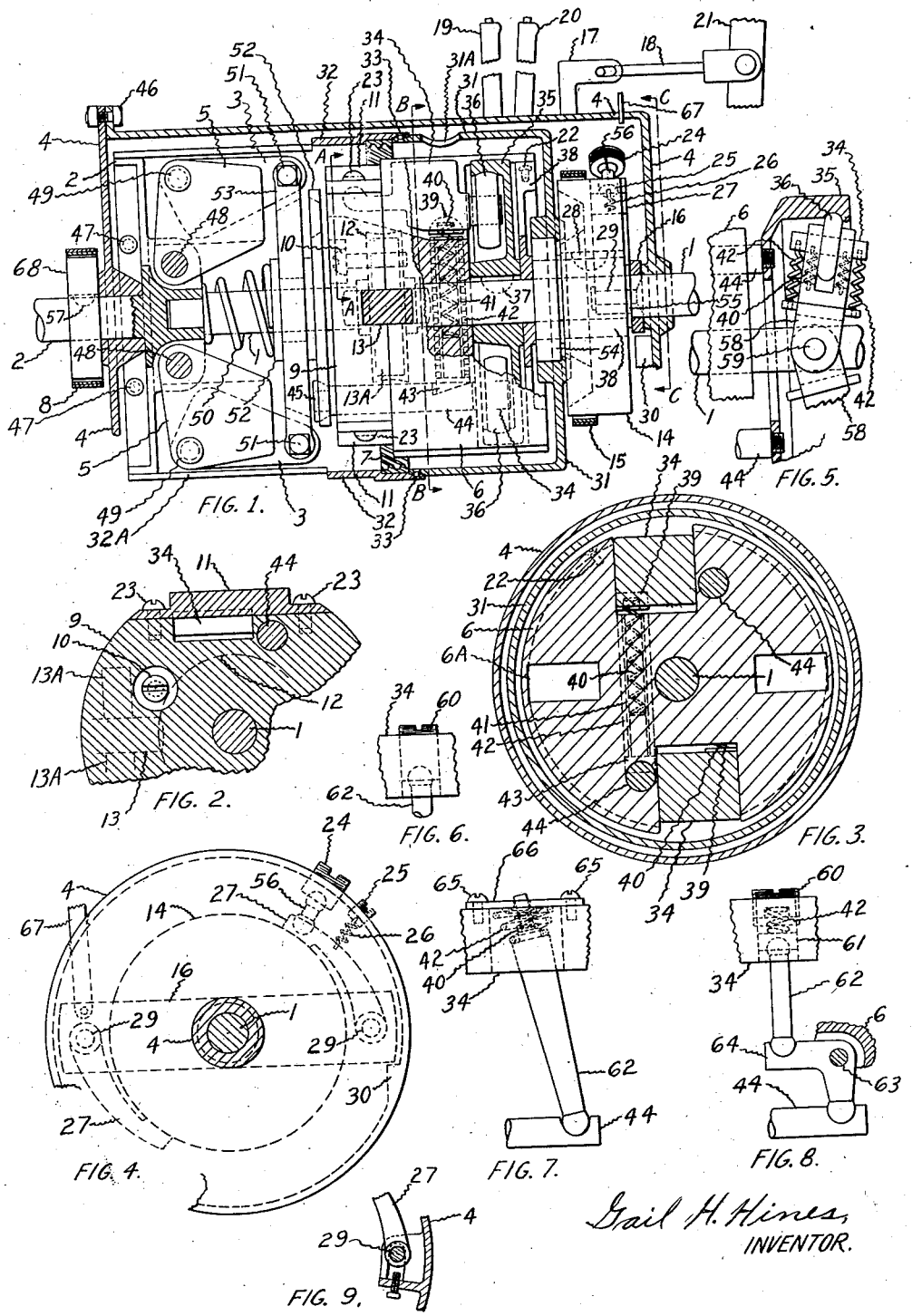
Gail H. Hines,
INVENTOR.

Patented July 22, 1930

1,771,040

UNITED STATES PATENT OFFICE

GAIL H. HINES, OF LANSING, MICHIGAN

FLEXIBLE AUTOMATIC TRANSMISSION

Application filed May 31, 1929. Serial No. 367,464.

The invention relates to power transmission, and particularly to the connection between a driving element such as the crankshaft of an ordinary automobile motor and a driven element such as the load shaft in positive driving relation with the rear wheels of an automotive vehicle, whereby the speed of the driven element may be varied automatically from that of the driving element in a gradually rising ratio as distinguished from a step by step ratio.

By the invention also the speed relation between the driving and driven elements is changed automatically not only by variations in load, but also by variations in the speed of the driven element to conform to that of greatest efficiency under the resistance torque conditions existing at the time.

Moreover, under abnormal conditions, as where traction is poor and the resistance of the load at high speed is practically nil, provision is made for manually broadening the transmission ratio to a point corresponding to the greatest traction efficiency under the existing conditions; however it will be obvious that in my device the relation of the torque control mechanism and the speed control mechanism is such that a resort to the foregoing emergency provision is practically unnecessary.

Furthermore, the last mentioned manual control is adapted to be employed as a braking mechanism when it is desired to descend a steep grade with the device locked into low or slow gear instead of the high or fast gear which would normally be effected.

And still another object of the invention is to include means whereby to quickly disconnect or render inoperative certain elements of the device to allow easy towing of an automobile.

While the invention is particularly applicable to a motor vehicle and is hereinafter described in that connection, its field of usefulness is not thus limited, but includes power transmission generally, as in machine tools, where it is desirable to translate substantially constant speed of a main drive into variable speeds at the machine and automatically to vary the ratio of transmission to maintain the highest efficiency at the point of application.

In general it is my aim to set forth these and certain other improvements and refinements which I have invented to elaborate upon the particular devices set forth in my Letters Patent No. 1,678,595, granted July 24, 1928, and No. 1,681,613 granted Aug. 21, 1928, on Power control devices, to which I refer you for more complete information regarding the basic idea upon which is made the improvements herein set forth, and in which previous Letters Patent some of the mechanisms herein employed are illustrated more in detail.

Furthermore, the basic novelty is substantially the same as disclosed in my application for Letters Patent on Flexible automatic transmissions filed Dec. 7, 1928, and having Serial No. 324,402; and it will be understood that a mechanism shown employed in any one of the above references to accomplish a particular result may be substituted for a similar mechanism employed in any other of my inventions, and therefore, in the following description I may describe only in general terms some mechanisms which are set forth more in detail in the aforesaid references.

The annexed drawings and the following description set forth in detail certain mechanisms embodying the invention, such disclosed means constituting, however, but few of the various mechanical forms in which the principle of the invention may be used.

In said annexed drawings: Figure 1 is a side elevational view, in part a side elevation and in part a vertical section showing one embodiment of my invention featuring all claims hereto annexed. Fig. 2 is a sectional view taken on line A—A of Fig. 1. Fig. 3 is a sectional view taken on line B—B of Fig. 1. Fig. 4 is a sectional view taken on line C—C of Fig. 1. Fig. 5 is a fragmentary view, in part a vertical section and in part a side elevation showing an equivalent form and arrangement of certain elements to vary the tension of springs as employed in my improved device. Fig. 6 is a fragmentary view showing an equivalent form and arrangement of elements showing rigid and adjustable connection with centrifugal weights such as I employ. Fig. 7 is a fragmentary view showing an equivalent form and arrangement of certain elements whereby certain springs may be quickly removed from their places in the device, and wherein I illustrate equivalent means to vary the tension of the springs. Fig. 8 is another fragmentary view similar to Fig. 7 showing adjustable connection of centrifugal weights which are joined to the governing mechanism of my device.

Fig. 9 is a fragmentary view showing how the shoe 27 may be carried in the case 4 for suitable relative movement with respect to other parts of the overrunning clutch as to be operatively employed when the bar 16 is omitted.

Inasmuch as certain mechanisms in my device are, generally made up of two or more like parts arranged symmetrically in pairs I may hereinafter indicate like parts, thusly arranged, as being plural but designated by the same single symbol.

Referring to the drawings, shafts 1 and 2 are journaled in alignment for relative rotation, one to the other, in the case 4. The driving shaft 1 is positively connected to the driven shaft 2 by means of a differential mechanism one of which I have chosen in the form of a planetary gear-assembly such as is more particularly illustrated in Fig. 9 of the aforesaid Patent No. 1,678,595, in which the spiral gear 12 is fixed to the driving shaft 1 and is in mesh with a pair of spiral planet-gears 13. The planet-gears 13 are also in mesh with an internal spiral-gear 7 which is fixedly connected to the driven shaft 2 and are journaled for rotation in a carrier including an energy absorbing member or fly wheel 6, a bearing member 9 fixed to the rear of the fly wheel 6 by means of cap screws 10, bearing blocks 11 fixed upon diametrically opposed radially disposed surfaces of the bearing member 9 by means of cap screws 23, a front wall 38 fitting concentrically within a forwardly projecting cutaway annular flange of the fly wheel 6 and fixed to the latter by means of cap screws 22, and a drum 14 fixed concentrically upon a forwardly projecting hub portion of the front wall 38 by means of a key 28. The internal spiral-gear 7 is pressed into the forward end of the rear portion of a cylindrical driven member comprising the rear cylindrical element 32 and the front cylindrical element 31, the two latter being concentrically fixed together by means of the rivets 33; and, to facilitate assembling, suitable holes 31A may be formed in the front cylindrical element 31, and the gear 7 may be made in annular halves or may be made in semi-annular halves. A radially extending wall portion of the shaft 2 carries a cutaway annular flange the periphery of which fits into the rear extremity of the rear cylindrical element 32 and the two last named parts are fixed together by means of rivets 47, or by any other ordinary means. The driven member, including the elements 2, 32, 7, and 31 is journaled at its rear extremity in the case 4 and is supported for rotation at its forward extremity upon the bearing assembly 54 which functions between the hub portion of the front wall 38 of the fly wheel 6 and the front wall of the front cylindrical element 31.

The planet-gear carrier is loosely mounted upon the driving shaft 1 so as to permit relative rotation, one to the other. The planet-gears 13 may have formed integral with them the axially disposed shafts 13A which are held journaled between the fly wheel 6 and the bearing member 9.

An elliptical cam 35 is fixed to the driving shaft 1 by means of a key 37 and is disposed at the rear of the front wall 38 of the fly wheel 6, the rearwardly projecting flange of the latter being formed radially outward beyond the periphery of the cam 35. A grooved race is formed internally of the axially disposed flange of the cam and rollers 36 are formed to fittingly roll in the grooved race and when forced radially outward are prevented from axial movement relative to the cam 35 except for a slight tilting movement. The rollers 36 are carried for rotation on shaftlike studs projecting rearwardly from weights 34 which are pivotally supported at their rear ends in the bearing blocks 11 and are guided for swinging movement within suitably formed recesses disposed diametrically opposite in the fly wheel 6. From each of said weight-receiving recesses there is formed a further spring-containing recess of cylindrical shape. Contained in each spring-containing recess is a spring 40 constantly under relatively light tension which is sufficient to support its respective weight 34 against gravity. Bearings 39 which are similar to woodruff keys possess cylindrical recesses entering perpendicularly from their rectangular surfaces and are fitted respectively, one in each weight 34 so as to have partial rotary movement. The cylindrical recesses of the bearings 39 are formed to fit the periphery of the springs 40, the outer ends of the latter being projected into the recesses. The inner ends of the springs 40 bear against the free ends of the shaft-like studs which project from the cams 43, the springs 40 and the studs having approximately the same outside diameter, concentric with each spring 40 is a sleeve 41 having an inside diameter slightly greater than the outside diameter of the spring. Concentric with each sleeve 41 is a second spring 42 of relatively high tension made from rod of rectangular section and is fitted to work freely between the respective sleeve 41 and the walls of its containing recess in the fly wheel 6. The springs 42 are disposed to work under tension between the cams 43 and the bearings 39 but are normally not under tension when the device is at rest. Disposed parallel with the driving shaft 1 the cam shafts 44 are slidably carried in the fly wheel 6 and are fitted adjacent to their front ends with the cams 43 so that rearward axial movement of the shafts 44 compresses the springs 40 and 42 to increase the pressure forcing the weights 34 outward. A radially flanged sleeve 52 is slidable on the driving shaft 1 and is secured to the rear extremities of the shafts 44 by means of the conical nuts 45 turned onto the threaded rear portions of the shafts 44. A split collar 53 has its halves secured together by means of bolts 51 and is rotatably mounted on the sleeve 52 for the purpose of axially shifting the latter. At their forward extremities the connecting links 3 are pivoted on the bolts 51 and at their rear extremities are pivoted on the pins 49, the latter being transversely disposed in the prongs of the bifurcated weights 5 and between which prongs are disposed the links 3. The weights 5 are pivoted between suitably formed ears which are integral with the driven shaft 2 and are thusly carried upon the pins 48. A spring 50 is disposed concentrically upon the driving shaft 1 between the driven shaft 2 and the sleeve 52 under tension to normally force the latter forward relative to the shaft 2. Shims or any other ordinary means may be employed to adjust the springs 50.

The shaft 1 passes loosely through the bar 16 which carries a pair of clutch shoes 27 which are pivoted on pins 29 for frictional contact with the peripheral surface of the drum 14, and a ball-and-socket joint is formed betwen each shoe 27 and a respective adjusting screw 24 by means of respective connecting links 56 which possess semi-spherical extremities. The relation of the links 56 and the shoes 27 is such that the shoes and the links form toggle joints of a disposition to make an overrunning clutch effecting the shoes to bear forcibly and with great friction upon the drum 14 when the bar 16 is sufficiently slightly rotated upon the shaft 1 in a counter-clockwise direction, the adjusting screws 24 being suitably turned into the case 4. Springs 26 of relatively light tension constantly bear the shoes 27 into slight frictional contact with the drum 14 so that counter-clockwise rotation of the drum 14 effects the shoes to bear with pressure sufficient to check the retrograde rotation of the drum 14 which normally rotates in a clockwise direction. The screws 25 in the case 4 receive the outer ends of the springs 26 in a manner to permit suitable adjustment of the tension. A lug 30 formed integral with the case 4 is suitably disposed for the purpose of limiting the movement of the bar 16. A connecting rod 67 of the rectangular section has its lower extremity pinned to the bar 16 at such a point as will render the overrunning clutch inoperative when the rod 67 is drawn forcibly upward. The upper extremity of the rod 67 may terminate in a suitable hand grip or may be connected with a lever or pedal and a latch mechanism such as are commonly employed for forcibly raising and latching a rod. Also a pedal may be connected with the rod 67 for the purpose of forcing the rod downward to effect the clutching operation of the overrunning clutch, and when such a pedal is employed it will be obvious that the overrunning clutch may be manually brought into play at will whereas the springs 26 which make the clutch automatic may be eliminated. A spacing washer 55 is inserted between the drum 14 and the bar 16.

A modification of my overrunning clutch is illustrated and described in my application for Letters Patent filed March 28, 1929, on Flexible automatic transmissions and having Serial No. 350,654. I may wish to employ this equivalent clutch mechanism for governing the revolution of the planet-gears, or I may employ one of the other known devices for this purpose some others of which I have illustrated and described in other references herein cited. And it will be further understood that other unit mechanisms which I have shown employed in this last named reference may be substituted in this later improved embodiment of my automatic transmission. For example in Fig. 5 of the application having Serial No. 350,654 I show a form of centrifugal clutch which may be included in the differential mechanism which connects the shafts 1 and 2 for variable speed ratios between the shafts, and in which the cam 36A replaces the cam 35, and respectively the weights 5 and the fly wheel 6A replace the weights 34 and the fly wheel 6. And it will be obvious that with the weights 5 substituted for the weights 34 and guided in the shaft 2 I may eliminate from the device the links 3, the collar 53, the springs 50, 40 and 42, the sleeve 52, the cams 43 and the cam shafts 44, and this will be obvious, further, from a perusal of the other references herein cited.

Likewise manual control of the cam shafts 44 may be had by means of the mechanism illustrated in Fig. 6 of the reference having Serial No. 350,654 and it will be obvious that the sleeve 38A may be formed as an integral portion of the sleeve 52.

A modification of the spiral gearing which I have chosen to employ is illustrated and described in the British Patent to Ridley James Urquhart, No. 8,304 of April 6, 1906. The worm gearing as set forth in this British patent is but one of the several known types of differential gearing which may be adapted for use in my improved device; another, which may be suggested is described in the United States patent to W. I. Wheeler, No. 1,695,356 of Dec. 18, 1928.

I provide manually actuated braking means on the planet-gear carrier and on the driven shaft 2. These braking means are described in detail in my application for Letters Patent on a similar device filed Dec. 7, 1928, and having Serial No. 324,402, and are shown herewith in Fig. 1 of the drawings wherein the band 15 is actuated by means of the motor-clutch foot-pedal 21 having connection through the lever 17 and connecting rod 18 adapted so that the motor-clutch may be disengaged before braking of the drum 14 is effected. Also a hand-lever 19 is operatively connected to the band 15 and is adapted to actuate the latter independently of the foot-pedal 21. Another brake band 8 is operable by means of the hand-lever 20 and is adapted for clutching relation with the peripheral surface of the drum 68, said drum being secured to the driven shaft 2 by means of the key 57, or the band 8 may be disposed to be operable upon some other peripheral surface of another element in connection with the driven shaft 2 such as the element 31 or 32.

The case 4 may be made cylindrical as shown and closed with a removable wall at the rear by means of bolts 46, or a case may be made by bolting together semi-cylindrical halves.

The fly wheel 6 is suitably recessed at 6A to receive the spiral planet-gears 13.

A reversing mechanism may be employed in combination with my improved device and adapted as is shown in the above references or in any other known manner.

In the operation and use of my power transmission device, for example we may consider the device as operating in an automobile. By manipulating the motor-clutch pedal 21 the shaft 1 is gradually clutched to the motor and then rotates at crankshaft speed driving the gear 12 transmitting power through the planet-gears 13 and the reduction gear 7 to the driven shaft 2 and hence to the rear wheels of the automobile. In starting the car from rest at first the resistance torque in the driven shaft 2 is great and the lesser driving torque in the shaft 1 is multiplied through the gearing and moves the car slowly forward; however not without a strong pressure from the resistance torque tending to force the drum 14 and fly wheel 6 to rotate in a retrograde direction relative to the clockwise rotation of the driving shaft 1. Such retrograde rotation is prevented by means of the overrunning clutch acting between the case 4 and the planet-gear carrier. As the speed of the vehicle increases the weights 5 are centrifugally forced outward, the sleeve 52 moves axially upon the shaft 1 and compresses the spring 50, the camshafts 44 are likewise moved and the springs 42 are brought under tension between the cams 43 and the weights 34 which are moved by means of the cam 35 which rotates at crankshaft speed. Moving the weights 34 against the tension of the springs 42 impels rotation in the flywheel 6 in proportion to the resistance torque and the tension of the springs 42, the tension of the latter varying proportionately with the speed of the driven shaft 2. Therefore when the motor power is sufficient to cause the vehicle to gain speed the tension in the springs 42 will become gradually greater until the fly wheel 6 is impelled to rotate at crankshaft speed effecting a one to one ratio between the driving and driven shafts. When the load becomes great and the motor power is not sufficient to maintain the speed of the vehicle whereby it is driven in high gear the centrifugal pressure in the weights 5 will decrease permitting the spring 50 to move the cam shafts 44 so as to lower the tension in the springs 42 and effect a series of intermediate gear ratios. When the fly wheel 6 is rotating there is centrifugal pressure in the weights 34 such as to aid the springs 42 in effecting high gear.

It will be obvious that the relation of the overrunning clutch is such that the vehicle may normally be towed forward, and when it is desired to easily tow the vehicle backward it is only necessary to latch the rod 67 in its upward position.

When it is desired to brake the vehicle through the gearing the manually actuated band 15 is clutched onto the drum 14.

In Fig. 5 of the drawings I show an equivalent formation and arrangement of certain elements wherein I have the cam 35 secured to the forward extremities of the shafts 44, the shafts being threaded and turned into the radially disposed flange of the cam, and the axially disposed flange which possesses the grooved race I have disposed projecting forwardly from the radially disposed flange of said cam so that variations in the centrifugal pressure in the weights 5 will cause axial movement of the cam 35 relative to the driving shaft 1. Pivoted on the pin 59 which projects transversely from the driving shaft 1 are carried the bifurcated spring-carrying elements 58, the latter being bifurcated both transversely and longitudinally so as to provide in each, four rectangular, outwardly projecting prongs among which are guided the rollers 36 and the shafts 34 upon which the rollers are rotatively mounted. The springs 40 of relatively light tension are adapted to constantly force the rollers 36 outward while the heavier springs 42 are adapted to be brought under tension when the vehicle has attained a certain speed which is preferably about three miles per hour, the spring tension becoming gradually greater as the vehicle accelerates until the radius from the center of the pin 59 to the outermost point of each roller 36 becomes shortest when the spring tension is normally sufficient to maintain a one to one drive between the shafts 1 and 2. It will be obvious that such an arrangement is especially desirable because of the convenience in removing the rollers 36 and the springs 40 and 42 accomplishment of which is done by first forcing the rollers inward and then swinging the spring-carrier 58 forward to clear the front face of the cam 35, suitable holes being provided in the cylindrical element 31 for access to said removable parts. Furthermore it will be understood that when the springs 40 and 42 are employed in my device as shown in Fig. 5 said springs will not be employed carried in the fly wheel 6 and the cams 43 will not be used, and it will be noted that in this arrangement centrifugal pressure in the rollers 36 may be varied by changing the speed of the motor while the speed of the driven shaft 2 governs the spring pressure forcing the rollers outward.

In Fig. 7 of the drawings I illustrate an equivalent arrangement and formation of elements connecting the weights 34 and the cam shafts 44 wherein connecting rods 62 are adapted to form ball-and-socket joints with the cam shafts 44, and the springs 40 and 42 are adapted to work under tension in a manner as hereinbefore described, removable plates 66 being secured upon accessible surfaces of the weights 34 by means of cap screws 65, the springs bearing against the plates through clearance holes in the weights. This arrangement shown in Fig. 7 is desirable for convenience in removing and replacing the springs 40 and 42, access being had through suitably disposed holes 31A formed in the cylindrical element 31, it being further understood that hand holes shall be provided in the case 4 as are commonly employed for inspection and making repairs.

In Fig. 8 of the drawings I show another equivalent mechanism for connecting the weights 34 and the shafts 44 wherein bell-crank levers 64 are fulcrumed on pins in the fly wheel 6, connecting links 62 have their ends socketed in the levers 64 and the plungers 61, the latter being adapted to work freely in cylinders formed in the weights 34, adjusting screws close the outer openings of the cylinders, and the springs 42 are disposed under tension between the screws 60 and the plungers 61. The parts 60, 61, 62 and the springs 42 are conveniently removed through the holes 31A formed in the cylindrical element 31. Furthermore it will be obvious that the springs 42 and the plungers 61 may be eliminated from the mechanism as illustrated in Fig. 6 of the drawings wherein I provide rigid connection between the weights 34 and the rods 44 whereas with each swinging movement of the weights 34 there will be a proportionate swinging effected in the weights 5.

It will be noted that ordinarily the speed ratios between the driving and driven shafts in my device are selected in part through the speed of the driven shaft 2 as well as through the resistance torque; and therefore it will be obvious that during a certain speed of the vehicle the speed ratios may vary between the driving and driven shafts through a variation in the resistance torque, and likewise during a certain resistance against propelling the vehicle the speed ratios may vary through a variation in the speed of the driven shaft which may be controlled at will by means of the motor throttle. However, my device may be governed through the torque control alone whereas the weights 5, the springs 50, the collar 53 and the sleeve 52 will be eliminated, and in this event I may employ one set of springs 40 constantly under tension between the weights 34 and the flywheel 6, and in the operation it will be noted that during high resistance torque there must be relative rotation between the cam 36 and the flywheel 6 except when the flywheel 6 is rotating at relatively high speed as during the time of the one to one ratio while centrifugal pressure is great in the weights 34. It will be clear why a high resistance should not affect the gear ratios when the vehicle is moving rapidly, as for example, if I should be traveling along at thirty miles per hour and should suddenly open the motor throttle to quickly attain a speed of fifty miles per hour at once there would be induced a high resistance and it would be very undesirable at this time to drop out of the one to one ratio. When the load is disconnected through the shift lever of the reversing mechanism disposed at the rear of my device and the motor clutch is engaged through manipulation of the pedal 21 it will be clear that I have a motor flywheel of such a proportion as is advantageous for the proper idling of the motor, and therefore the regular motor flywheel may be much lighter than is common.

Where I have employed certain elements in pairs I may wish to use but one each of some of these, as one weight 34, one spring 40 or one planet-gear 13.

While I have illustrated and described fair working examples of my device in this application and in the aforesaid references I do not wish to be understood as limiting myself to the specific details of construction and formation of the elements shown, as under the spirit of my invention I believe that I am entitled to employ a wide variation of detail such as may fall within the scope of the appended claims.

Having thus described my invention, what I claim as new and desire to secure by Letters Patent, is:—

1. The combination with a driving shaft and a driven shaft in alignment, of a train of gears positively connecting the shafts including a gear carrier rotatable on the axis of the shafts for rotation relative to said shafts, a gear journaled for rotation in said carrier, a driving gear attached to the driving shaft and a driven gear attached to the driven shaft, of a clutch mechanism with automatically controlled clutching effect operatively connecting the ensemble including the driving shaft and said driving gear to the ensemble including the driven shaft, said driven gear, said carrier and the gear journaled therein, said clutch mechanism including a centrifugally operating weight in positive connection with one of said ensembles and free to be moved against centrifugal resistance, means in connection with the other ensemble to move said weight against centrifugal resistance, means controlled through the speed of the driven shaft in operative connection with the ensemble comprising said weight and the means to move the weight against centrifugal resistance whereby to control the clutching effect and vary gradually the ratio of speed transmission, and of means to control the rotation of the gear carrier.

2. The combination, with a driving shaft and a driven shaft, of a differential mechanism connecting the shafts possessing spring-controlled means for controlling the speed of the driven shaft, of means to automatically control the spring-controlled means through the speed of the driven shaft, of means to operatively connect the last named means to the spring controlled means, of a case, and of lock mechanism operative between the case and the differential mechanism to control the latter.

3. In a power transmission device, the combination with a driving shaft and a load-carrying driven shaft, of a planetary differential gear-assembly positively connecting the driving shaft to the driven shaft, of planet-gear revolution control means, and of clutch means operatively connecting the driving shaft to the ensemble including the driven shaft, the planet-gear carrier, and the gears connecting the driven shaft to said carrier, said clutch means possessing a centrifugally operating weight free to be moved against centrifugal resistance, means in connection with the driving shaft to move said weight against centrifugal resistance for clutching effect, a second weight revolved proportionately to the speed of the driven shaft, and means operatively connecting the weights so that said second weight controls the other said weight to govern the clutching effect whereby to vary gradually the ratio of speed transmission.

4. In a power transmission device, the combination with a driving and driven shaft, of a differential mechanism connecting said shafts possessing a weight, means to revolve the weight, a spring and apparatus which moves the weight against centrifugal resistance and against spring pressure whereby to vary gradually the ratio of speed transmission, of a case, and of lock mechanism operable between the case and the differential mechanism to control the latter.

5. In a power transmission device, the combination with a driving and driven shaft, of a differential mechanism connecting said shafts possessing a weight, means to revolve the weight, a spring and apparatus which moves the weight against centrifugal resistance and against spring pressure, means to govern the spring pressure through the speed of the driven shaft, of a case, and of lock mechanism operable between the case and the differential mechanism to control the latter.

6. In a power transmission device, the combination with a driving shaft and a driven shaft in alignment, of a differential mechanism positively and clutchingly connecting the shafts including a train of gears positively connecting the shafts having a gear carrier rotatable on the axis of said shafts for relative rotation to the shafts, one of the gears journaled for rotation in said carrier and in mesh with the gear attached to the driven shaft, together with clutch means comprising an internal cam and a weight possessing a roller forced centrifugally against the cam, said cam being rotatable relative to said weight, means to revolve said weight, governor means controlled through the speed of the driven shaft to govern the operation of the ensemble including said weight, the roller and the cam, and means including relatively rotatable elements operatively connecting the governor means to said ensemble whereby to vary gradually the ratio of speed transmission, of a case, and of lock mechanism operative between the case and the differential mechanism to control the latter.

7. In a power transmission device, the combination with a driving shaft and a driven shaft, of a differential mechanism connecting the shafts including a planetary gear-assembly positively connecting the shafts and a centrifugally operating clutch possessing a weight which is revolved proportionately to the speed of the driven shaft, a second weight revolved proportionately to the speed of the planet-gear carrier, free to be moved against centrifugal resistance and having operative connection with the first weight, and means in connection with the driving shaft to move the second weight against centrifugal resistance whereby to vary gradually the ratio of speed transmission, and of means to control the differential mechanism.

8. The combination with a driving shaft and a driven shaft in alignment, of a train of gears positively connecting the shafts including a gear carrier rotatable on the axis of the shafts for rotation relative to said shafts, a gear journaled for rotation in said carrier, a driving gear attached to the driving shaft and an internal driven gear attached to the driven shaft, of a clutch mechanism with automatically controlled clutching effect operatively connecting the ensemble including the driving shaft and said driving gear to the ensemble including the driven shaft, said driven gear, said carrier and the gear journaled therein, said clutch mechanism including centrifugally operating weights revolvably attached to one of said ensembles and free to be moved against centrifugal resistance, a rotary cam in connection with the other ensemble to move said weights against centrifugal resistance, means controlled through the speed of the driven shaft in operative connection with the ensemble comprising said weights and the cam whereby to control the clutching effect and vary gradually the ration of speed transmission, and of means to control the rotation of the gear carrier.

9. The combination with a driving shaft and a driven shaft, of a differential mechanism connecting said shafts possessing clutch means having operative connection with the driving shaft and means to automatically control the clutch means through the speed of the driven shaft, of means to automatically or manually control the differential mechanism, and of a second means to manually control the differential mechanism having operative connection with a power-control means so as to be actuated through the latter.

10. In a power transmission device, the combination with a driving and driven shaft, of a spring-controlled differential mechanism connecting said shafts possessing a spring and spring-controlling means, a centrifugally operating weight and means to move the weight against spring resistance and against centrifugal resistance whereby to vary the speed ratios between the shafts through the resistance torque, of a case, of automatically actuating block mechanism operable between the case and the differential mechanism, and of manually actuated lock mechanism operable between the case and the differential mechanism to control the latter.

11. The combination with a driving shaft and a driven shaft, of a differential mechanism positively and clutchingly connecting the shafts including a planetary gear-assembly positively connecting the shafts, a rotary cam, an element moved by the cam, a spring giving said element operative pressure against the cam, and means controlled through the speed of the driven shaft operatively connected to the ensemble including the cam, the said element and the spring to vary said operative pressure whereby to vary gradually the ratio of speed transmission, of a case, and of planet-gear revolution control means having operative connection with the case.

12. The combination with a driving shaft and a driven shaft, of a differential mechanism positively and clutchingly connecting the shafts including a planetary gear-assembly, an internal rotary cam attached to the driving shaft, an apparatus in operative relation with the cam and possessing a spring which is worked through the rotation of the cam, and means to automatically control said apparatus to vary the work done against the spring whereby to vary gradually the ratio of speed transmission, of a case, and of planet-gear revolution control means having operative connection with the case.

13. In a power transmission device, the combination with a driving shaft and a driven shaft in alignment, of a differential mechanism connecting the shafts including a planetary gear-assembly positively connecting the shafts and a centrifugally operating clutch connecting the gear-assembly and the driving shaft, of means to control the differential mechanism, of a sleeve and a collar operatively connected for relative rotation, one to the other, and movable axially with respect to said shafts, of centrifugally operating toggle-joint weights in connection with the collar and operating through the speed of the driven shaft to axially move the sleeve and collar, and of means connecting the sleeve and the clutch so as to control the latter through the axial movement of the former whereby to vary gradually the ratio of speed transmission.

14. In a power transmission device, the combination with a driving shaft and a driven shaft, of a differential mechanism connecting the shafts possessing a first apparatus which possesses a spring and a weight which is free to be moved through pressure from the spring and oppositely moved through the rotation of the driving shaft, said apparatus having operative connection with the driving shaft, and a second apparatus which has operative connection with the driven shaft and the first apparatus to control the latter whereby to vary the speed ratios between the shafts, and of means to control the differential mechanism.

15. In a power transmission device, the combination with a driving and driven shaft, of a differential mechanism connecting the shafts possessing a spring-actuated torque-controlled apparatus which has a spring and spring-working means and is in operative connection with the driving shaft, of centrifugally operating spring-controlling means in operative connection with the driven shaft and said apparatus to vary the spring pressure of the latter to affect the torque-controlling effect whereby to vary the speed ratios between the shafts, of a case, and of lock mechanism operating automatically between the case and the differential mechanism to control the latter.

16. The combination with a driving shaft and a driven shaft, of a differential mechanism connecting the shafts possessing spring-controlled means for controlling the speed of the driven shaft, of means having operative connection with the first named means to automatically control the spring-controlled means through the speed of the driven shaft, of a case, of automatically actuating lock mechanism having operative connection with the case to control the differential mechanism, and of means to manually control the differential mechanism having means for operative connection with a power-control means so as to be actuated through the latter.

17. The combination with a driving shaft and a driven shaft, of a planetary transmission mechanism connecting the shafts and including spring-controlled means for controlling the speed of the driven shaft, said means including a cam and apparatus possessing a spring worked by the cam, means for automatically actuating said cam to control the speed of the driven shaft in proportion to the load, of a case, and of planet-gear revolution control means operable between the case and the transmission mechanism.

18. In a power transmission device, the combination with a driving shaft and a driven shaft, of a planetary differential gear-assembly connecting the shafts, of planet-gear revolution control means, and of three-way clutch means operatively connecting the driving shaft, the gear assembly and the driven shaft, said clutch means possessing a cam with an internal race and attached to the driving shaft for rotation therewith, a centrifugally operating weight revolved proportionately to the speed of the driven shaft, free to be moved against centrifugal resistance and operatively connected to the gear assembly for rotation relative to the latter, a roller in rolling contact with the cam race and interposed between said race and the weight so that the weight is moved against centrifugal resistance through rotation of the cam whereby to vary gradually the ratio of speed transmission.

19. The combination with a driving shaft and a driven shaft, of a differential mechanism connecting the shafts including a train of gears, a cam with a rotary groove, an apparatus possessing a centrifugally operating weight against which work is done by moving said weight through rotation of the cam, a roller fitting said groove and operatively connecting said weight and the cam, and means to control said apparatus to vary said work through the speed of the driven shaft whereby to vary gradually the ratio of speed transmission, of a case, and of lock mechanism having operative connection with the case to control the differential mechanism.

20. In a power transmission device, the combination of a driving shaft, a load-carrying driven shaft in alignment with the driving shaft, a planetary differential gear-assembly connecting the driving shaft to the driven shaft, planet gear revolution control means, clutch means operatively connecting the ensemble comprising the driving shaft and the gear fixed thereon to the ensemble comprising the driven shaft, the planet-gear and the carrier in which said planet-gear is journaled for rotation as well as carried for revolution about the axis of said shafts, and the gear attached to the driven shaft and in mesh with the planet-gear, said clutch means including a centrifugally operating weight free to be moved against centrifugal resistance and in positive connection with one of said ensembles, means in positive connection with the other ensemble to move said weight against centrifugal resistance and apparatus having operative connection between the driven shaft and the ensemble for relative rotation to the latter comprising said weight and the means to move the weight against centrifugal resistance and controlled through the speed of the driven shaft to govern the resistance effect of moving said weight whereby to vary gradually the ratio of speed transmission.

Signed at Lansing, in the county of Ingham and State of Michigan, this 27th day of May, 1929.

GAIL H. HINES.

CERTIFICATE OF CORRECTION.

Patent No. 1,771,040.                                                    Granted July 22, 1930, to

GAIL H. HINES.

It is hereby certified that error appears in the printed specification of the above numbered patent requiring correction as follows: Page 7, line 18, claim 8, for "ration" read ratio; line 44, claim 10, for "block" read lock; and that the said Letters Patent should be read with these corrections therein that the same may conform to the record of the case in the Patent Office.

Signed and sealed this 28th day of October, A. D. 1930.

(Seal)                                                        M. J. Moore,
                                                              Acting Commissioner of Patents.